April 4, 1944.  G. H. GIBSON  2,345,805
VARIABLE SPEED ELECTRICAL DRIVE
Filed June 12, 1942  2 Sheets-Sheet 2

INVENTOR
GEORGE H. GIBSON
BY
John E. Hubbell
ATTORNEY

Patented Apr. 4, 1944

2,345,805

UNITED STATES PATENT OFFICE 2,345,805

VARIABLE SPEED ELECTRICAL DRIVE

George H. Gibson, Montclair, N. J.; Anna Gibson and George Gibson, executors of said George H. Gibson, deceased Application June 12, 1942, Serial No. 446,756

5 Claims. (Cl. 172—239)

The general object of the present invention is to provide a variable speed electrical drive or transmission, of novel and desirable type. More specifically, the object of the present invention is to provide an electrical drive or transmission comprising two dynamo-electric machines, one of which normally functions as a D. C. generator and the other as a D. C. motor, and each of which comprises relatively rotatable armature and field elements, with one element of each machine carried by and turning with the driven shaft, and characterized by the arrangement of the two machines so that in a normal operating condition, the electro-magnetic interactions between the armature and field elements of the two machines will subject the driven shaft to turning torque in the same direction.

In one form of the present invention, the field element of the generator is stationary, but is energized by multi-phase currents to create a rotating magnetic field acting on the armature of the generator, and in this case the commutator engaging brushes of the generator may be rotated in synchronism with the rotating field by a synchronized alternating current motor.

The generator machine may supply direct current, through its commutator and brushes, to brushes and a commutator connected to the armature winding of the motor which may have its field stationary and energized by direct current. In principle, however, the present invention is reversible in the sense that it may be arranged to operate with either armature or either field element secured to and rotating with the driven shaft. Moreover, in lieu of providing the generator with a commutator and brushes, I may use a mercury arc rectifier to supply to the motor brushes unidirectional current generated in armature windings of the generator.

Another specific object of the invention is to provide an arrangement in which the variable speed electric drive provisions may be used to obtain rotation in synchronism with the rotating field.

Another specific object of the invention is to provide suitable control means for avoiding certain undesirable voltage and current conditions which wide changes in the speed of the driven shaft tend to produce.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 4 is a diagrammatic view illustrating a modification in which the motor armature is supplied with current through a mercury arc rectifier.

Figure 1:
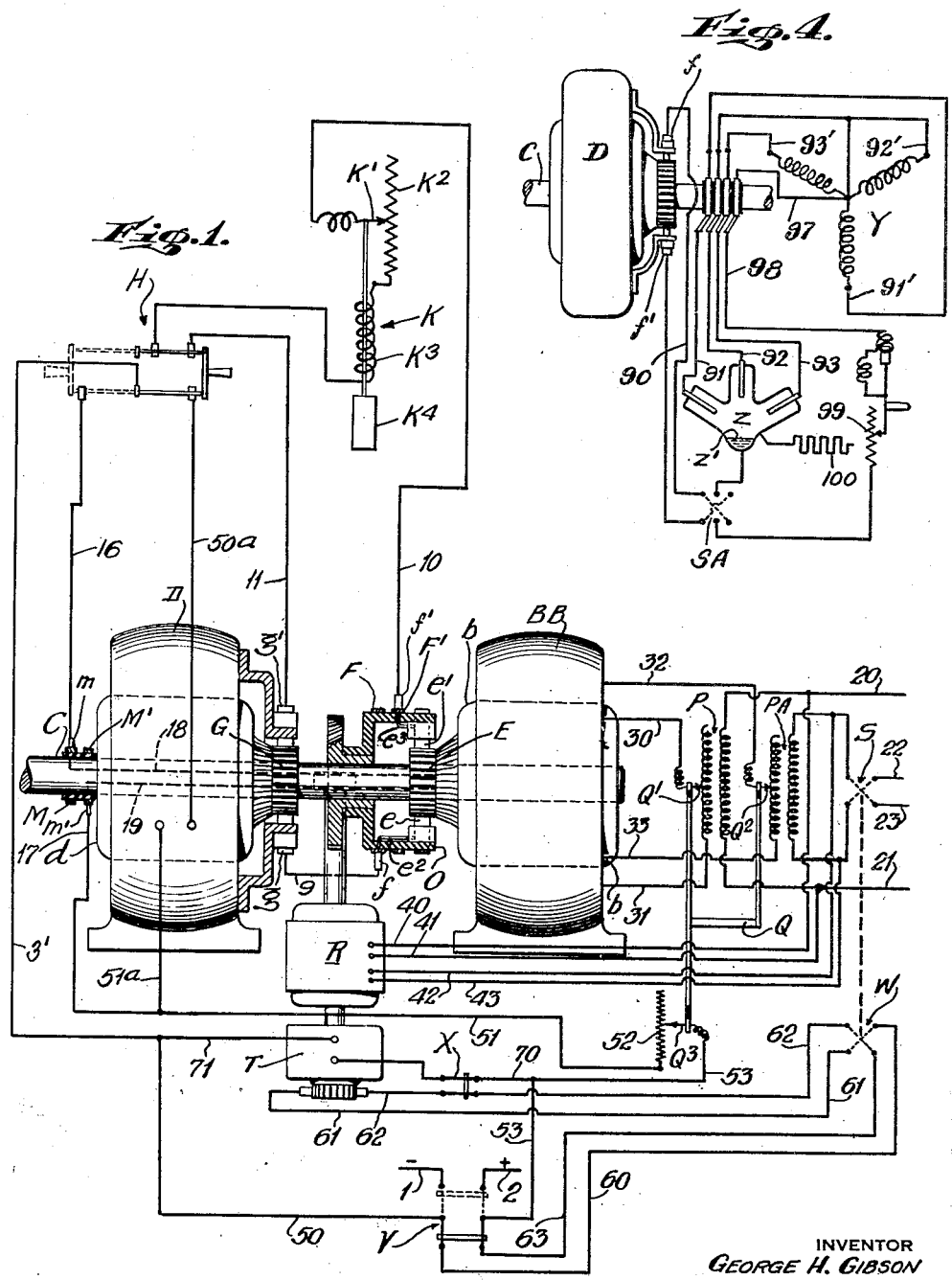
Fig. 1 is a diagrammatic representation of a preferred form of the present invention.

In the form of the invention illustrated by way of example in Fig. 1, the generator field element BB is a stationary structure provided with a multi-phase winding, so as to create a revolving magnetic field, and its brushes $e$ and $e'$ and slip rings F and F', are carried by an element O journalled on the shaft C, so that it may rotate at an angular velocity which is the same as the angular velocity of the magnetic field created by the field element BB. The generator has its armature $b$ secured to the driven shaft C. The latter also has secured to it the armature $d$ of a direct current motor having a stationary field element D.

The commutator brushes $e$ and $e'$ engaging commutator E of the generator, are mechanically supported by the rotating element O and rotated in synchronism with the rotating field of the generator, as hereinafter described. As shown, the brush $e$ is connected by a terminal $e^2$ to a slip ring F and the brush $e'$ is connected by a terminal $e^3$ to a slip ring F'. The two slip rings are arranged side by side and are suitably insulated from the rotating element O. The brushes $f$ and $f'$ engaging the slip rings F and F', respectively, pass the current generated by the generator to the commutator brushes $g$ and $g'$ engaging the commutator G of the motor armature $d$. The generator brush $f$ is directly connected to the motor brush $g$ by a conductor 9. The generator slip ring brush $f'$ is connected, in the normal operating condition shown in Fig. 1, to the motor brush $g'$, through a circuit branch including a conductor 10, the contact K' of a controller K, a portion of the resistance $K^2$ of the controller K, the winding $K^3$ of the latter, one terminal of the switch H, one blade of the latter, and a conductor 11 which is connected to the brush $g'$.

In the operating condition in which the switch

H occupies the position shown in Fig. 1, the conductors 50 and 51 supplied by the direct current generator T energize the field winding of the motor element D, and the current generated in the winding of the armature b is delivered to the winding of the motor armature d. In consequence of their electro-magnetic interaction, the generator armature b is subjected to a torque tending to rotate the driven shaft C in the direction of rotation of the magnetic field of generator BB. The connections between generator and motor brushes are such that the direction of current flow through the winding of the motor armature d results in an electro-magnetic interaction between the motor field D and armature d, which also subjects the driven shaft C to a torque in the same direction in which the generator tends to turn the driven shaft. With the motor and the generator each subjecting the driven shaft to a turning torque in the direction in which that shaft rotates, the magnitude of the current flow through the motor armature winding needs to be but a fraction of what it would need to be if the motor supplied all of the power used in rotating the shaft C. With half of the required torque furnished by the generator, the current flow through the motor armature winding need be only half that which would be required with the same field excitation if the motor furnished the entire driving torque.

The effective torque impressed on the driven shaft by each of the dynamoelectric machines is a function of the armature current and a function of the excitation of the field winding of the machine D and of the polyphase current flowing through the windings of BB. The strength of the current flowing through the two armatures is proportional to the difference between the voltage induced in the winding of generator armature b and the counter-electromotive force induced in the winding of the motor armature d. The generator voltage induced is directly proportional to the difference between the angular speeds of the rotating field in BB and of armature b, and to the strength of the magnetic flux created by the rotating field. The counter-electromotive force generated in the winding of the armature d is directly proportional to the strength of the motor field and to the speed of rotation of the armature d. In consequence, it is generally desirable to increase the exciting current supplied to the generator field element and to motor field element as the speed of the driven shaft C increases.

The controller device K serves as an automatic safety device operating automatically to prevent the armature current from becoming large enough to burn out either armature. As the armature current increases, the armature $K^4$ of the device K is drawn further up into the coil $K^3$, thus raising contact $K'$ and increasing the amount of resistance $K^2$ in series with the two armature windings. Conversely, the armature $K^4$ moves down and decreases the resistance $K^2$ in circuit as the armature current diminishes.

When the conditions are such as to make it desirable that the driven shaft should have the same angular velocity as the driving shaft, this result may be secured and the apparatus heat losses minimized by interrupting the current flow through the armature and field windings of the motor elements D and d, and by supplying an exciting current to the armature winding of the armature b, as well as polyphase current to the field BB, so as to electro-magnetically couple the said field and the armature element for synchronous rotation. This result is obtained with the circuit arrangements shown in full lines in Fig. 1 by adjusting the switch H from its right hand position shown in the drawing into its left-hand position shown in dotted lines.

In that position, switch H connects the conductor 50 to the terminal conductor 16 of a brush m engaging a slip ring M carried by the shaft C. Supply conductor 51 is connected to the terminal 17 of a brush m' bearing on a slip ring M' on the shaft alongside the ring M. The slip ring M is connected by a conductor 18 to the winding of the armature b. The slip ring M' is connected by conductor 19 to the winding of the armature b at a point displaced one pole width from the point of the winding to which the conductor 18 is connected. The adjustment of the switch H into its left-hand dotted line position interrupts the energization of the field element D by disconnecting the conductor 50a from the supply conductor 50 and interrupts the energization of the armature b by disconnecting the conductors 10 and 11 through which current normally flows from the brush f' to the brush g'. The slips rings M and M' may be located at any convenient point along the length of the shaft and in practice it will ordinarily be more convenient to locate them between the commutators E and G than in the positions shown.

As diagrammatically shown in Fig. 1, alternating current of one phase is supplied by conductors 20 and 21, and alternating current of another phase is supplied by supply conductors 22 and 23. The primary of a transformer P is connected to the supply conductors 20 and 21 and has its secondary terminals connected to the terminals 30 and 31 of the field winding of the element BB. The primary of a second transformer PA is connected to the supply conductors 22 and 23, and has its secondary terminals connected to the terminals 32 and 33 of the field winding of the field element BB. As diagrammatically shown in Fig. 1, the field winding terminals 30 and 32 are connected to contacts $Q'$ and $Q^2$, respectively, carried by an element Q adjustable to simultaneously vary the effective number of turns of the secondary windings of the transformers P and PA, and thereby vary the secondary voltages of the two transformers. The device Q may be adjusted manually or automatically to facilitate the starting operation, and to maintain suitable speed conditions with the varying loads. As those skilled in the art will understand, in lieu of the particular circuit connection shown in Fig. 1, use may be made of any one of the various known arrangements for supplying multi-phase currents.

As shown, the element O is gear-connected to, and rotated by, a synchronous alternating current motor R, which advantageously is of self-starting type and which has terminals 40 and 41 connected to the supply conductors 20 and 21 and has terminals 42 and 43 connected to the supply conductors 22 and 23. As shown, a reversing switch S is provided for interchanging the connection between the supply conductors 22 and 23 on one hand, and the primary terminals of the transformer PA and the synchronous motor terminals 42 and 43, on the other hand, so as to thereby reverse the direction of rotation of the magnetic field created by the element BB, and of the device O and of the shaft C.

The motor field element D of Fig. 1 may be energized in various ways, and in Fig. 1 provisions are shown for effecting its energization by means of an exciting generator T driven by the synchronous motor R or, alternatively, through conductors 1 and 2 from a separate source of D. C. current, accordingly as the double pole, two throw switch V is in its full line, or in its dotted line, position. In its full line position, the switch V connects one terminal 50a of the field element D to one terminal 60 of a reversing switch W. In one position the switch W connects the conductor 60 to one armature terminal 61 of the exciter T, and the second terminal 51a of the field winding of the element D is then connected to the second armature terminal 62 of the exciter T, through circuit connections including a variable resistance 52, a cooperating contact $Q^3$ carried by the previously described element Q, a conductor 53, one blade of the switch V, and a conductor 63 which is then connected through the switch W to the conductor 62. In this condition of the apparatus, the field of the exciter T has one terminal 70 connected to the conductor 53 and thence, through connection previously described, to the exciter armature terminal 61.

The reversing switch W may be connected to the previously mentioned switch S, so that when the direction of rotation of the field induced by the field element BB and the direction of rotation of the motor R are reversed by actuation of the switch S, the switch will be operated to connect the exciter armature terminals 61 and 62 to the element terminals 51 and 50, respectively. In consequence, when the adjustment of the switch S reverses the polarities of the exciter armature terminals 61 and 62, the simultaneous adjustment of the switch W prevents a change in the direction of current flow through the field winding of the element D. This is essential to the desired operation of the motor D, since the adjustment of the switch S reverses both the direction of rotation of the armature $d$ and the direction of the current flow through the winding of that armature.

When the switch V is in its dotted line position shown in Fig. 1, the terminal 50 of the field element D is directly connected by the switch to the supply conductor 1 and, at the same time, the switch connects the supply conductor 2 to the field terminal 51a through the conductor 53, contact $Q^3$ and resistance 52. When the switch V is in its dotted line position, the field and armature windings of the exciter T are advantageously open-circuited, as may be effected with the arrangement shown, by opening the double pole switch X. With each of the described modes of energizing the element D, the adjustment of the member Q, which through contacts Q' and $Q^2$ varies the strength of the field of the generator element BB, through contact $Q^3$, effects a reverse change in the strength of the field of the motor element D.

Figure 2:
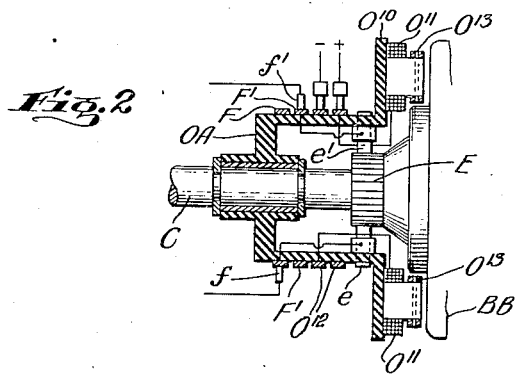
Fig. 2 is a fragmentary view illustrating a modification.

In lieu of making use of a separate motor R to rotate the structure carrying the brushes $e$ and $e'$ and slip rings F and F', the element O in Fig. 1 may be replaced by an element OA, as shown in Fig. 2, which omits the gear portion of the element O and includes a multi-polar field element $O^{10}$. The latter has its field winding $O^{11}$ energized by direct current which may be supplied through slip rings $O^{12}$, carried by the element OA and cooperating brushes. The field element $O^{10}$ is so disposed, relative to the generator field element BB, that the rotating magnetic field produced by the latter will effect a synchronous rotation of the element OA. Since the energy required to rotate the element OA is minute, the efficiency of the magnetic interaction between the elements BB and OA is unimportant.

Advantageously, the multipolar field element $O^{10}$ should be provided with a squirrel cage or other short circuited winding $O^{13}$, so that it may be self-starting, and may operate as an induction motor while its speed builds until it approaches synchronism with the speed of the rotating field created by the field element BB. Thereafter, the element $O^{10}$ may readily be drawn into full synchronism with said rotating field by the excitation of its main winding by current supplied by the brushes $e$ and $e'$, or some other suitable source of direct current. To facilitate the starting up operation, provisions including a control switch may be made for delaying the direct current excitation of the field winding $O^{11}$ of the element $O^{10}$ until the speed of the latter has been raised by its induction motor action approximately into synchronism with the angular speed of the rotating field created by the element BB. The winding $O^{13}$ also serves to restrict any tendency to small periodical fluctuating variations in the angular speed of the member OA relative to the angular speed of the rotating field created by the element BB.

The general operation of the forms of the invention illustrated in Figs. 1 and 2 will be apparent from the foregoing. With the armature $b$ of Fig. 1 energized with direct current, as when the switch H is in its left-hand position, and with the field winding of the element D of Fig. 1 de-energized, the field element BB and armature $b$ will collectively form a synchronous motor. In the arrangement shown in Figs. 1 and 2, the elements BB and $b$ and the commutator, slip rings and brushes associated with the armature $b$, form, in effect, a simple rotary converter.

Figure 3:
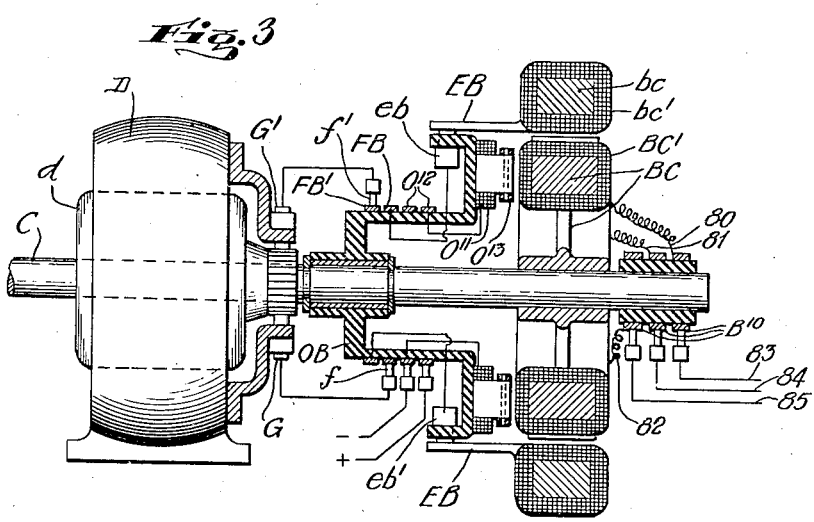
Fig. 3 is a diagrammatic view illustrating another modification.

As previously indicated, any general type of embodiment of the present invention may have either its field element or its armature secured and rotating with the driven shaft. This characteristic of the invention is illustrated in Fig. 3, in which the armature and field elements of the generator shown in Fig. 2 are inverted in the sense the generator armature $bc$ of Fig. 3 is stationary, and the generator field element BC is mounted on and turns with the driven shaft C. The multiphase winding BC' of the field element BC has its terminals 30, 31 and 32 connected to corresponding slip rings $B^{10}$, carried by the shaft C and respectively engaged by brushes connected to multiphase current supply conductors 33, 34 and 35, and is so disposed and energized as to create a magnetic field rotating, relative to the core of the element BC, about the axis of the latter in a direction opposite to the direction of rotation of the driven shaft C.

The stationary generator armature $bc$ has a winding $bc'$ and a commutator EB. The latter is engaged by brushes $eb$ and $eb'$ carried by a rotating element OB. The latter is generally similar to the element OA of Fig. 2, including main and auxiliary windings $O^{11}$ and $O^{13}$ through which the element OB is caused to rotate about the shaft C in synchronism with the rotation in space of the magnetic field set up by the winding BC', i. e., the velocity of the element OB is thus equal to the difference between the velocity of rotation of said field relative to the core of the element BC, and the smaller velocity in the opposite direction of the driven shaft C.

The current generated in the armature winding $bc'$ may be passed from the brushes $eb$ and $eb'$ of the element OB to slip rings FB and FB' carried by the element OB and engaged by brushes $f$ and $f'$, respectively. The latter are shown as connected to the brushes G and G' of a motor element D, which may be identical with that shown in Fig. 1. The element OB includes slip rings $O^{12}$ engaged by brushes supplying direct current for energizing the winding $O^{11}$ of the element OB.

In any of the above described forms of my invention I may replace the commutator and brushes associated with the generator armature winding, by other rectifying means such as a multi-phase mercury arc rectifier. Thus, as shown diagrammatically in Fig. 4, the brush $f$ of a motor D, which may be exactly like the motor D of Fig. 1, is connected by a conductor 90 and reversing switch SA to the mercury cathode $Z^1$ of a multi-phase mercury arc rectifier Z which has its three anodes connected by conductors 91, 92 and 93 and slip rings carried by the shaft C to terminals 91', 92', and 93' of an alternating current winding Y of a generator armature element, which may be exactly like the element $b$ of Fig. 1.

As shown diagrammatically in Fig. 4 the winding Y is of star type, and each of its terminals 93, 94 and 95 in conjunction with its common terminal 97, is adapted to supply alternating current displaced 120° in phase in advance of one and behind the other of the two alternating currents supplied by the circuits including the other terminals of the winding Y. As shown, the common terminal 97 of the winding 96 is connected through a slip ring carried by the shaft C, a conductor 98, and the switch SA to the motor armature brush $f'$. Advantageously, and as shown, the conductor 98 includes a manual or automatic current limiting resistance 99, and the rectifier Z is provided with a starting connection 100 which may be of customary form.

The reversing switch SA is employed to reverse the connections between the motor and generator armature windings, when a reversal of the connections to the generator field element (not shown) makes the operation of said switch desirable.

The simple arrangement shown diagrammatically in Fig. 4 is adapted to supply to the armature brushes $f$ and $f'$ a pulsating unidirectional current induced in the generator armature winding. As those skilled in the art will understand, by increasing the number of separate alternating currents rectified and suitably displacing the phase of those currents, the current flow through the motor armature winding may be as smooth as conditions may require.

While slip rings are required in the rectifier including modifications of the arrangement shown in Figs. 1 and 3, such slip rings are not required when a mercury arc rectifier is used with such an arrangement as is shown in Fig. 3, in which the generator armature element does not rotate.

While in accordance with the statutes, I have illustrated and described the best forms of my invention now known to me, it will be apparent to those skilled in the art that changes may be made in the form of the invention set forth in the appended claims. For example, in lieu of automatically adjusting the amount of resistance $K^2$ in circuit, as provided for in Fig. 1, such resistance adjustment may be made manually when conditions make this desirable. Some features of my invention may also be used with advantage without a corresponding use of other features.

This application is a continuation in part of my prior application Serial No. 361,496, filed October 17, 1940.

Having now described my invention, what I claim as new and desire to secure by Letters Patent, is:

1. An electrical drive mechanism comprising a driven shaft, an electric motor having a direct current armature element and a field element subjecting the motor armature to a magnetic field tending to induce rotation of the shaft in the desired direction, an electric current generator having an armature element and a field element including a field winding excited by multi-phase currents and subjecting the generator armature to a rotating magnetic field revolving about the axis of and tending to propel said shaft in the direction of its desired rotation, said motor and generator each having one of its elements stationary and having its other element secured to said shaft, and means for passing unidirectional current induced in the generator armature through the motor armature.

2. An electrical drive mechanism comprising a driven shaft, an electric motor and an electric current generator, each having a direct-current armature and a field element and each having one of its elements secured to said shaft, said generator field element having a multi-phase field winding adapted when energized to create a magnetic field rotating about the axis of said shaft relative to the generator armature element, a structure rotatable about the axis of the driven shaft, generator commutator brushes mounted on said structure and through which said generator supplies direct current to said motor armature, and a synchronous motor adapted to rotate said structure with an angular velocity equal to the angular velocity of said field when said synchronous motor and winding are energized by currents of the same frequency.

3. An electrical drive mechanism as specified in claim 1, including a regulator responsive to and regulating the strength of the induced current flow.

4. A driven shaft, an electric motor and an electric current generator each having a direct-current armature element and each having a field element, the motor field element being energized by current flow in a direct-current winding and the generator field element being excited by current flow in a polyphase current winding, said generator having one of its said elements secured to said shaft, means for causing the generator field to rotate about the axis of said shaft in a direction to induce the desired direction of rotation of the latter, said motor having one of its elements secured to said shaft and the other of its elements stationary, motor field energizing means for subjecting the motor armature to a magnetic field of regulated intensity, means passing current induced in the generator armature to the motor armature, and means optionally operable to render said motor field energizing means inoperative and for passing current through the generator armature to thereby cause said shaft to rotate in synchronism with the generator field.

5. An electric drive mechanism comprising a driven shaft, an electric motor having a field element and cooperating direct current armature element, an electric current generator having an armature element including a winding and a field element having a multiphase field winding adapted when energized to create a magnetic field rotating about the axis of said shaft relatively to the generator armature element, said motor and generator each having one of its elements secured to said shaft, said motor field element comprising means for subjecting the motor armature to a magnetic field tending to induce rotation of the shaft in the desired direction when said armature is supplied with unidirectional current and said generator field element comprising means for subjecting said generator armature winding to a magnetic field revolving about the axis of said shaft in a direction to propel the shaft in the direction of its desired rotation and means cooperating with said winding for supplying to the motor armature unidirectional current from the generator winding.

GEORGE H. GIBSON.